United States Patent [19]

Kosaka et al.

[11] 4,115,814
[45] Sep. 19, 1978

[54] CIRCUIT FOR EXTINGUISHING ABNORMALLY HIGH VOLTAGE IN TELEVISION RECEIVER

[75] Inventors: Kimito Kosaka; Kunio Umehara; Takeshi Maruyama, all of Yokohama, Japan

[73] Assignee: Hitachi, Ltd., Japan

[21] Appl. No.: 768,752

[22] Filed: Feb. 15, 1977

[30] Foreign Application Priority Data

Feb. 20, 1976 [JP] Japan .................................. 51-17066

[51] Int. Cl.² .......................... H04N 5/44; H04N 5/68
[52] U.S. Cl. ........................................ 358/243; 361/91
[58] Field of Search .................. 358/190, 243; 317/31, 317/33 VR; 361/91

[56] References Cited

U.S. PATENT DOCUMENTS

3,840,784   10/1974   Schauffele .............................. 317/31

Primary Examiner—Robert L. Richardson
Attorney, Agent, or Firm—Craig & Antonelli

[57] ABSTRACT

A circuit for preventing an abnormally high voltage in a television receiver having a stabilized power supply circuit of a switching type, wherein a voltage proportional to the high voltage applied to the anode of the picture tube is always detected and when the high voltage abnormally rises, the output of the power supply circuit is interrupted by stopping the switching operation of the power supply circuit.

24 Claims, 6 Drawing Figures

CIRCUIT FOR EXTINGUISHING ABNORMALLY HIGH VOLTAGE IN TELEVISION RECEIVER

This invention relates to a circuit for preventing an abnormally high voltage in a television receiver and more particularly to a circuit for preventing an abnormally high voltage in a television receiver having a power supply circuit of the switching type, which blocks the output of the power supply circuit of the television receiver when an abnormally high voltage is induced in the television receiver.

A high voltage is applied to the anode of the picture tube of a television receiver in order to accelerate electrons emitted by the electron gun. The high voltage is as high as about 25 KV for, for example, a 25-inch television receiver. An abnormal rise in this voltage will cause an increase in the beam current in the picture tube resulting an increased X-ray radiation. The increased X-ray radiation harmfully affects the human body and moreover the abnormally high voltage damages the circuit elements of the television receiver. Therefore, an abnormally high voltage extinguishing circuit is needed to extinguish the normal rise of the high voltage.

An abnormally high voltage extinguishing circuit has already been proposed which when an abnormally high voltage is induced, the video circuit is disconnected from the electron gun of the picture tube by detecting the abnormally high voltage so that the generation of electrons is stopped to extinguish the increase in the beam current in the picture tube and therefore to avoid the adverse influence on the human body due to X-rays. However, although this system indeed decreases the generation of the X-rays, it does not eliminate the abnormally high voltage itself. As a result, the adverse effects on the circuit elements due to the abnormally high voltage still remain and, in addition, the beam current cannot be completely stopped.

There is also known a circuit which prevents the abnormal rise of the high voltage by stopping the operation of the horizontal oscillation circuit upon the detection of the abnormal rise of the high voltage (for example, in laid-open Japanese Utility Model Application SHOWA No. 49-4531). As is well known, the high voltage applied to the anode of the picture tube of a television receiver is obtained by rectifying a voltage induced in the secondary winding of a flyback transformer provided at the output end of a horizontal deflection circuit. Accordingly, the high voltage applied to the anode of the picture tube vanishes if the output of the horizontal deflection circuit is reduced to zero by stopping the operation of the horizontal oscillation circuit included in the horizontal deflection circuit. This system, in which the high voltage is prevented from being generated when it abnormally rises, is more preferable in view of preventing an abnormally high voltage than the previous system in which the video circuit is disconnected. However, the horizontal deflection circuit is still supplied with a B voltage from the power supply circuit which also supplies B voltages to the vertical deflection circuit and the video circuit. According to the system in which the operation of the horizontal oscillation circuit is stopped when the high voltage abnormally rises, however, unnecessary power is supplied to some sections of the television receiver. Therefore, such a system may incur an unexpected accident such as an outbreak of fire due to an overheat of the circuit element if the careful manipulation of the television receiver is neglected, that is, the power switch is kept on through forgetfulness, after a reproduced picture is extinguished due to the occurrence of such an abnormally high voltage. Also, according to this system, when an abnormally high voltage is generated due to a fault in a power supply circuit, an undesirable output voltage, e.g., a voltage in excess of a predetermined level, of the power supply circuit cannot be prevented from being applied to several parts of the television receiver.

On the other hand, a system has been known, for example from U.S. Pat. No. 3,546,536, in which an abnormally high voltage is detected, and a direct current applied to a horizontal circuit, a video circuit, etc., from a power supply circuit is cut off by means of a detection signal. This system is more preferable than the above-described systems in view of the fact that all load circuits are stopped in their operations when an abnormally high voltage is induced. In such a system, however, as an interruption element, a relay is provided in the output path of the power supply circuit on which the direct current is derived or a series circuit of a fuse and a switch element is provided in the input path of the power supply circuit on which an alternate current is supplied, and hence the following disadvantages are inevitably involved.

In the case of using such a relay, when an abnormally high voltage is induced, the relay is deenergized and its contact is opened, while in the case of using such a series circuit of a fuse and switch element, a large current is allowed to flow through the series circuit so that the fuse may blow. In either case, a large current is made to flow through the contact of the relay or the switch element before of full load current can be interrupted. Accordingly, a relay of large current capacity or a switch element of high breakdown voltage and large current capacity is necessary and therefore a high cost is unavoidable for this system. Further, in the case of using such a series circuit, the fuse does not blow for a small duration of a large current and hence such a large current of a small duration may be introduced into the switch element which may be composed of a transistor, a thyristor or the like, so that it may damage the switch element.

On the other hand, in a television receiver having as a power supply circuit a series control type regulator which delivers a stabilized D.C. voltage by controlling the emitter-collector impedance of a transistor provided in series with the direct current path, an attempt may be made to extinguish an abnormal rise of the high voltage by turning the transistor off at occurrence of an abnormally high voltage. Even if the transistor is turned off, however, the output direct current is not completely interrupted. This is because a resistor is normally provided in parallel with the transistor for countermeasure for lowering of the power capacity of the transistor, for a power supply to an error detecting circuit controlling the transistor, and for the protection of the transistor from an abnormally large current which will be caused in the case of overload. Otherwise, a transistor of large capacity would be necessary and a high manufacturing cost would be inevitable.

The object of this invention is therefore to provide a reliable circuit for extinguishing an abnormally high voltage eliminating the above drawbacks of the prior arts, for a television receiver.

For attaining the above object, according to the invention, a switching type stabilized power supply circuit with a chopper circuit is used for a power supply circuit of a television receiver, and the output voltage of the power supply circuit is extinguished when the high voltage applied to the anode of the picture tube abnormally rises by detecting such an abnormal rise and stopping the switching operation of the chopper circuit in accordance with the detection. In this switching type regulator, the output direct current is completely interrupted by stopping its switching operation and further a small control signal suffices for stopping the switching operation.

According to the invention, there is provided an abnormally high voltage extinguishing circuit for a television receiver comprising a stabilized power supply circuit of the switching type having a chopper circuit and a control circuit for controlling the switching operation of the chopper circuit so as to generate a stabilized output voltage from the power supply circuit, and a horizontal deflection circuit having a horizontal output circuit and a flyback transformer, the horizontal deflection circuit receiving the stabilized output voltage of the power supply circuit, supplying a current to a horizontal deflection coil, and also supplying a high voltage to an anode of a picture tube through the flyback transformer; the abnormally high voltage preventing circuit comprising first means for generating a voltage proportional to the high voltage and for detecting whether or not the generated voltage exceeds a predetermined level and second means connected with the first means for operatively controlling the control circuit to stop the switching operation of the chopper circuit when the voltage generated by the first means exceeds the predetermined level.

The present invention will be described in detail with reference to the accompanying drawings, in which.

Figure 1:
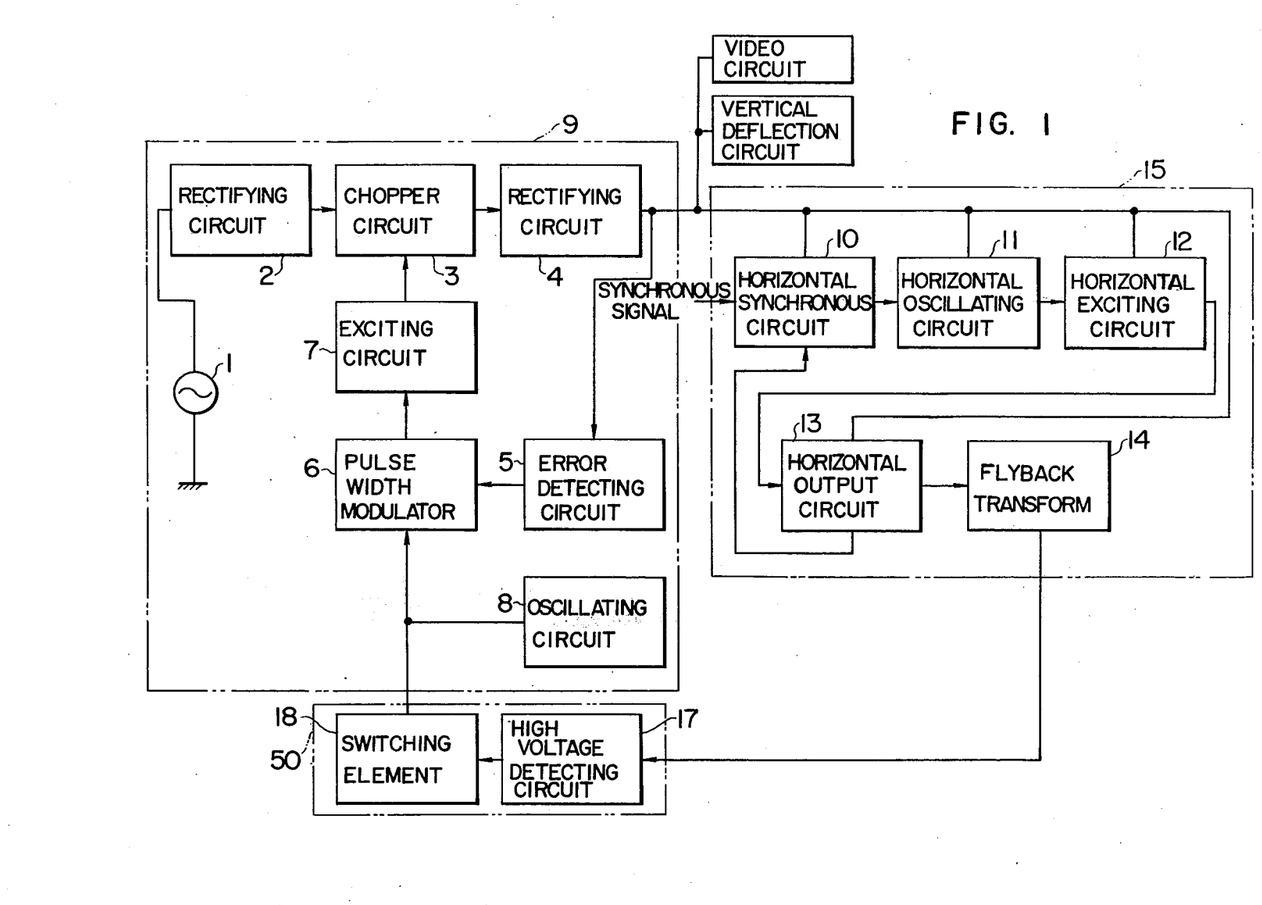
FIG. 1 shows in block diagram a horizontal deflection circuit provided with a stabilized power supply circuit of switching type and a circuit for extinguishing an abnormally high voltage, according to an embodiment of the invention.
Figure 2:
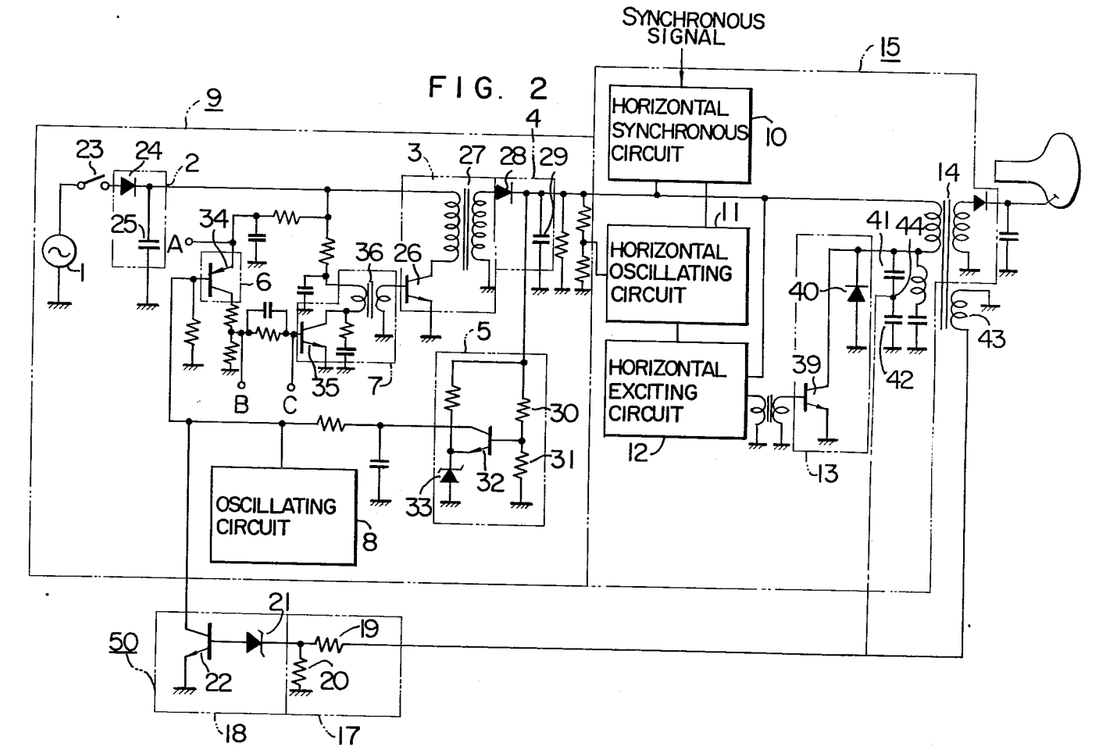
FIG. 2 shows a specific circuit corresponding to the block diagram shown in FIG. 1.

FIG. 1 shows in block diagram a circuit for extinguishing an abnormally high voltage in a television receiver, according to an embodiment of this invention and FIG. 2 shows a specific circuit of the embodiment, the wiring to the video circuit and to the vertical deflection circuit being omitted in FIG. 2. A stabilized power supply circuit, indicated at reference numeral 9, comprises an A.C. power supply 1, a rectifying circuit 2, a chopper circuit 3, a rectifying circuit 4, an error detection circuit 5, a pulse width modulator 6, an exciting circuit 7 and an oscillating circuit 8. The rectifying circuit 2 rectifies an A.C. voltage supplied from the A.C. power supply 1 and in turn supplies the rectified voltage, i.e., a D.C. voltage, to the chopper circuit 3. The chopper circuit 3 chops the D.C. voltage in accordance with the output of the pulse width modulator 6. The chopped D.C. voltage is rectified again by the rectifying circuit 4 and the rectified output is supplied as a B voltage to the horizontal deflection circuit 15, a vertical deflection circuit and a video circuit. The pulse width modulator 6 generates a pulse voltage having a desired pulse width in accordance with the output of the oscillating circuit 8 and drives the exciting circuit 7 to operate the chopper circuit 3 at a desired duty ratio. The error detecting circuit 5 detects the fluctuation in the output voltage of the rectifying circuit 4 and generates a control signal for the pulse width modulator 6 so as to control the width of the output pulse of the pulse width modulator 6. The chopper circuit 3 has its switching time, i.e., duty ratio, controlled in accordance with the output of the pulse width modulator 6 so that the output voltage of the rectifying circuit 4 is stabilized. Such a stabilized power supply circuit, per se, is known from, for example, U.S. Pat. No. 3,819,986.

A horizontal deflection circuit, designated at numeral 15, comprises a horizontal synchronous circuit 10, a horizontal oscillating circuit 11, a horizontal exciting circuit 12, a horizontal output circuit 13 and a flyback transformer 14. A pulse voltage is fed back from the horizontal output circuit 13 to the horizontal synchronous circuit 10. The B voltage of the stabilized power supply circuit 9 is applied to the horizontal synchronous, oscillating, exciting and output circuits 10, 11, 12 and 13. The operation of the horizontal deflection circuit 15 described above is well-known and therefore the description of the operation is omitted.

A circuit 50 for extinguishing an abnormally high voltage consists of a high voltage detecting circuit 17 and a switching element 18, the circuit 17 being connected with the flyback transformer 14 and the element 18 being connected with the input of the pulse width modulator 6. The circuit 50 derives a pulse voltage or a rectified version of the pulse voltage, proportional to a high voltage applied to the anode of a picture tube, from a tertiary winding of the flyback transformer 14. The derived voltage is supplied to the detecting circuit 17 so that the switching element 18 is turned on when the high voltage exceeds a predetermined level. In this case, the pulse width modulator 6 stops its pulse modulating function and the switching operation of the chopper circuit 3 ceases, so that the rectifying circuit 4 delivers no output, i.e., the power supply circuit 9 delivers no output.

The description of this embodiment will be further detailed with reference to FIG. 2. The rectifying circuit 2 for the A.C. power supply 1 consists of a diode 24 and a capacitor 25 and the chopper circuit 3 is constituted mainly of a transistor 26 and a transformer 27. The rectifying circuit 4 is composed of a diode 28 and a capacitor 29 and the error detecting circuit 5 is made up of resistors 30 and 31, a transistor 32 and a zener diode 33. The pulse width modulator 6 has a transistor 34 and the exciting circuit 7 includes a transistor 35 and a transformer 36. The horizontal output circuit 13 consists mainly of a transistor 39, a diode 40, and capacitors 41 and 42. Reference numeral 43 indicates the tertiary winding of the flyback transformer 14. In the abnormally high voltage extinguishing circuit 50, the detecting circuit 17 is composed of resistors 19 and 20 and the switching element 18 is composed of a zener diode 21 and a transistor 22.

When the transistor 22 is in the off state, the transistor 34 is controlled by the saw-toothed signal derived from the oscillating circuit 8 and performs its switching operation so that the collector current flows in the form of pulse. The transistor 35 performs its switching operation by receiving as its input a voltage induced by the collector current. The transistor 35 therefore drives the transistor 26 into its switching operation through the pulse transformer 36. The transistor 26 chops the D.C. current obtained by rectifying and smoothing the A.C. current from the A.C. power supply 1 through the combination of the diode 24 and the capacitor 25 so that a voltage is induced across the secondary winding of the pulse transformer 27. The induced voltage is rectified and smoothed through the combination of the diode 28 and the capacitor 29 and then applied as the B voltage to the horizontal deflection circuit.

The tertiary winding 43 of the flyback transformer 14 picks up a voltage proportional to the high voltage applied to the anode of the picture tube and the voltage, after having been divided by the resistors 19 and 20, is supplied to the zener diode 21. If the high voltage applied to the anode of the picture tube rises abnormally, the voltage supplied to the zener diode 21 rises accordingly. The transistor 22 is turned on when the voltage obtained through the division by the resistors 19 and 20 exceeds $V_Z + V_{BE}$, where $V_Z$ is the zener breakdown voltage of the zener diode 21 and $V_{BE}$ is the voltage developed between the base and the emitter of the transistor 22. When the transistor 22 is turned on, the base voltage of the transistor 34 is lowered so that the transistor 35 reaches its saturated state to stop the switching operation. Accordingly, the collector current of the transistor 34 becomes almost constant and since the transistor 35 does not perform its switching operation, the transistor 26 is not driven. Consequently, no voltage is induced in the secondary winding of the pulse transformer 27 and therefore no output is delivered by the power supply circuit 9. As a result, the horizontal deflection circuit receives no B voltage so that the horizontal output circuit 13 delivers no output, and hence no high voltage is produced for the anode of the picture tube. Here, it is also possible to derive the voltage proportional to the high voltage from the junction point 44 of voltage dividing capacitors 41 and 42, as shown by the wiring indicated by a dot-and-dashed line in FIG. 2. In the case where the collector of the transistor 22 is connected with the point A, when the transistor 22 is turned on, the transistor 34 is turned off to interrupt the collector current. Accordingly, no input is supplied to the transistor 35 and therefore the chopping operation is no longer performed. In the case where the collector of the transistor 22 is connected with the point B or C, the same effect can be obtained. It therefore makes no practical difference whether the collector of the transistor 22 is connected with the point A, B or C.

In the embodiment shown in FIG. 2, the switching element, i.e., transistor 22, which has no holding function, is immediately turned off as soon as the abnormally high voltage has been removed by stopping the generation of the high voltage applied to the anode of the picture tube. Consequently, the power supply circuit 9 resumes delivering its output. Therefore, this embodiment is effective only in the case where the cause of the abnormally high voltage is eliminated in a short time, but is not effective in the case where the cause lasts for a long time.

Figure 3:
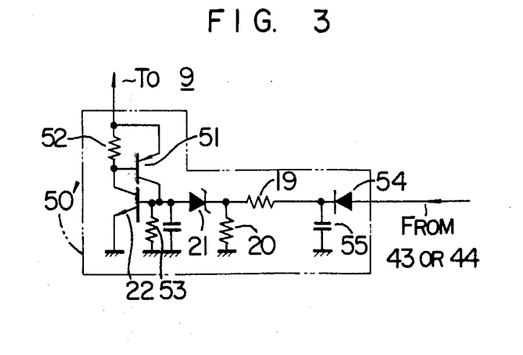
FIG. 3 shows a specific circuit for improvement of the abnormally high voltage extinguishing circuit shown in FIG. 2, according to another embodiment of the invention.

FIG. 3 shows an embodiment of the invention for eliminating the above disadvantage. According to this embodiment, A circuit 50' for preventing an abnormally high voltage is provided with a holding circuit which holds the conductive state of the transistor 22 when the transistor 22 is turned on. The holding circuit consists of a transistor 51 and resistors 52 and 53. When the transistor 22 is turned on, the transistor 51 is forward biased by the current flowing through the resistor 52. Accordingly, the transistor 51 is turned on to cause a current to flow through the resistor 53 so that the voltage developed across the resistor 53 holds the conductive state of the transistor 22. Namely, once an abnormally high voltage is generated to turn the transistor 22 conductive, the conductive state is held so that the output voltage of the power supply circuit also continues to be blocked. A rectifying circuit composed of a diode 54 and a capacitor 55 serves to rectify and smooth the voltage proportional to the abnormally high voltage. The rectifying circuit is provided for preventing the transistor 22 from being released from the locked conducting state when the abnormally high voltage is an oscillating one. Whether the collector of the transistor 22 is connected with the point A, B or C, makes no practical difference, as in the embodiment shown in FIG. 2. It is possible also in this embodiment to derive the voltage proportional to the high voltage from the junction point 44 of the voltage dividing capacitors 41 and 42 of the tertiary winding 43 (FIG. 2).

Figure 4:
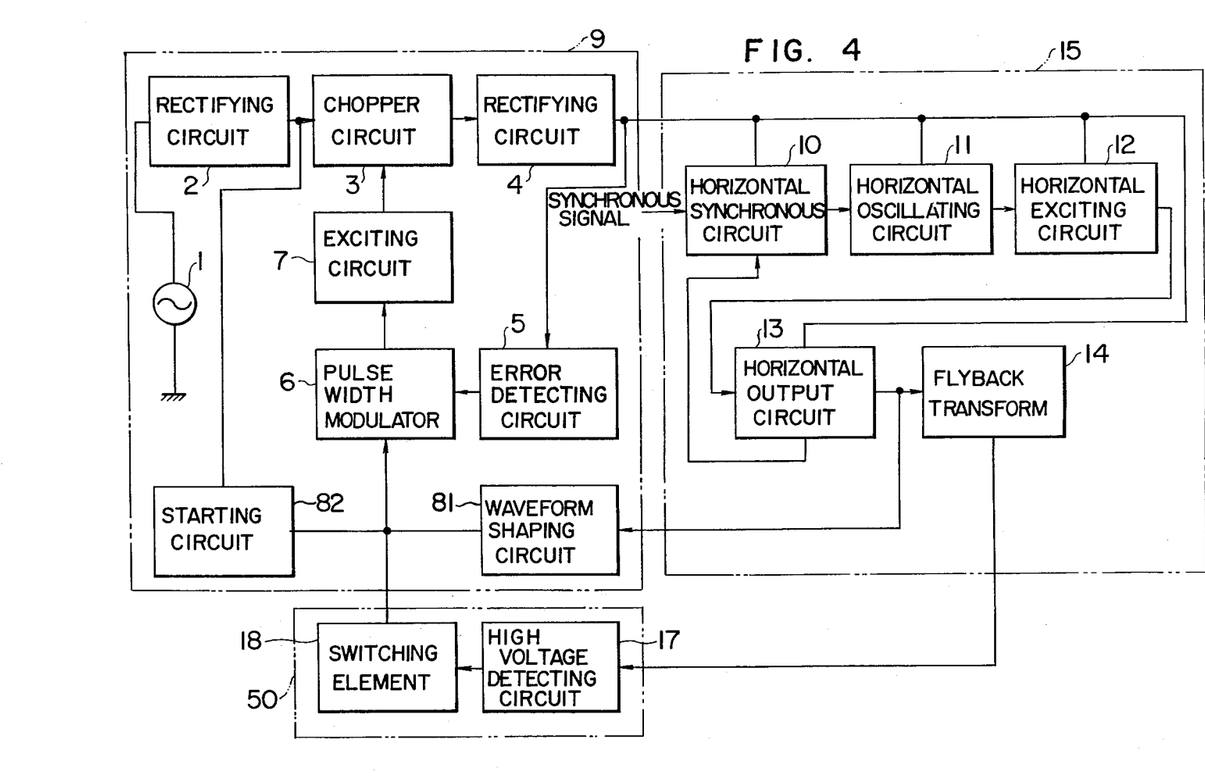
FIG. 4 shows in block diagram a horizontal deflection circuit provided with a switching type stabilized power supply circuit different from the stabilized power supply circuit shown in FIG. 2 and an abnormally high voltage extinguishing circuit, according to another embodiment of the invention.

FIG. 4 shows in block diagram an embodiment of this invention in which the circuit for preventing an abnormally high voltage is applied to a power supply circuit of the switching type, invented by one of the inventors of this invention and disclosed in the specification of the Japanese patent application No. 51-17065 filed in Feb. 20, 1976. The power supply circuit 9' has a waveform shaping circuit 81 for shaping the flyback pulses applied to the flyback transformer 14 into a sawtooth signal and a starting circuit 82 for starting the power supply circuit, in place of the oscillating circuit 8 in FIGS. 1 and 2. The other circuit configuration is the same as those shown in FIG. 2, as seen from FIG. 5.

Figure 5:
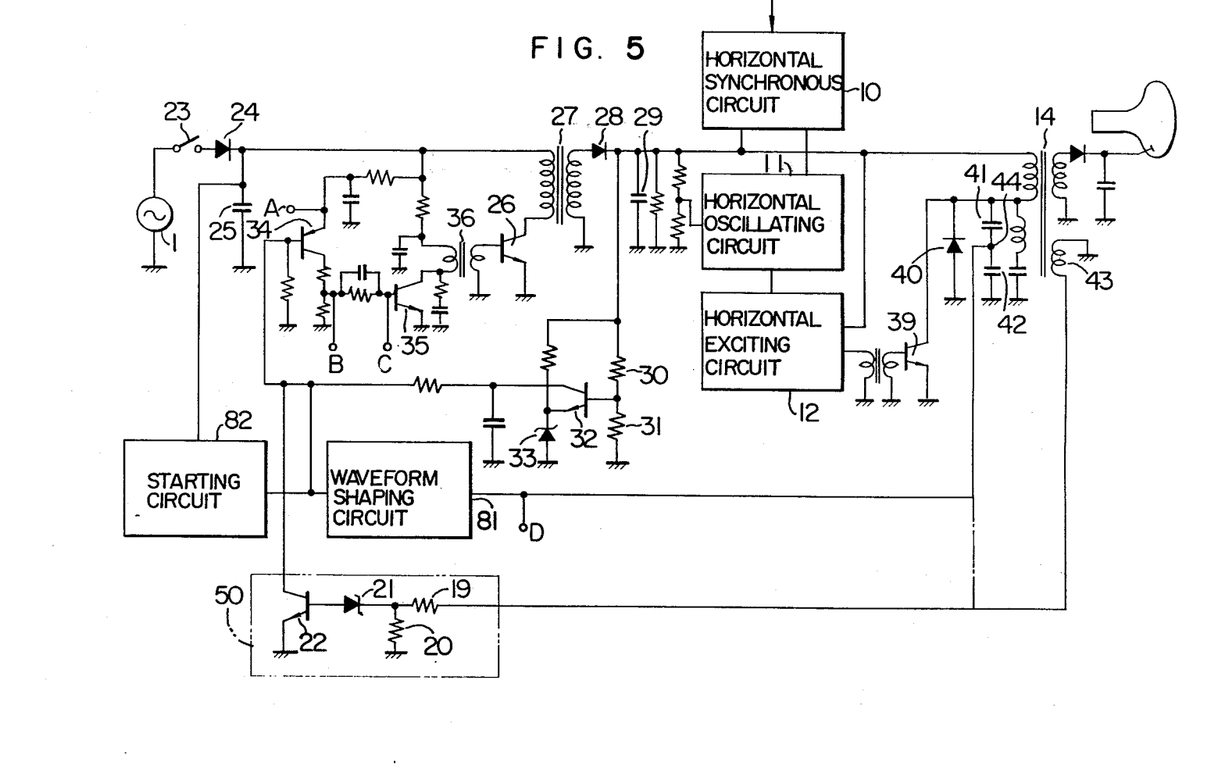
FIG. 5 shows a specific circuit corresponding to the block diagram in FIG. 4.

FIG. 5 is a concrete circuit corresponding to the block diagram of FIG. 4. The waveform shaping circuit 81 includes therein, for example, an integrating circuit which integrates the flyback pulses or the voltage proportional to the flyback pulse signal so as to generate a saw-tooth signal for controlling the switching operation of the transistor 34. Since the flyback pulses are obtained only after the horizontal deflection circuit has been operated by the B voltage supplied from the power supply circuit 9', there is a need for a starting signal for causing the power supply circuit 9' to perform its switching operation so that the B voltage is delivered when the switch 23 is closed. The starting circuit 82 is provided for this purpose. The starting circuit 82 includes therein, for example, a capacitor and an astable multivibrator. The astable multivibrator is operated only during the period of time for which the charging current due to closure of the switch 23 is flowing into the capacitor so that the transistor 34 is supplied with the starting signal to perform its switching operation. The power supply circuit 9' having the waveform shaping circuit 81 and the starting circuit 82, does not fall under the scope of this invention and therefore the detailed description thereof is omitted.

The circuit configuration and the operation of the abnormally high voltage preventing circuit 50 shown in FIG. 5 are the same as those of the circuit 50 shown in FIG. 3. The only difference is that since the power supply circuit 9' is operated through the feedback of the output of the horizontal output circuit 13, the output of the power supply circuit can be continuously blocked without holding the conductive state of the transistor 22 in the case where the abnormally high voltage lasts for a period longer than the period determined by the time constant of the horizontal deflection circuit 15. In the embodiment shown in FIG. 5, the voltage proportional to the high voltage is derived from the tertiary winding 43 of the flyback transformer 14, but it may also be taken out at the junction point 44 of the voltage dividing capacitors 41 and 42, as shown by a dot-and-dashed line wiring in FIG. 5. It is also possible to connect the collector of the transistor 22 with any one of the points A, B and C as in the above embodiments. Also, if in this embodiment the collector of the transistor 22 is connected with the point D, the conduction of the transistor 22 cuts the control signal to the transistor 34. Consequently, the switching operation of the power supply circuit 9' is not performed and the power supply circuit delivers no output voltage. Thus, the same effect can be obtained by connecting the collector of the transistor 22 with the point D.

The abnormally high voltage extinguishing circuit 50 in FIG. 5 may be replaced by the improved abnormally high voltage preventing circuit 50' shown in FIG. 3 in which the switching element, i.e., the transistor 22 is provided with the holding circuit. Even in this case, the collector of the transistor 22 may be connected with any one of the points A, B, C and D. instead of the base of the transistor 34, and the voltage proportional to the high voltage may be derived from the junction point of the capacitors 41 and 42, as previously described.

Figure 6:
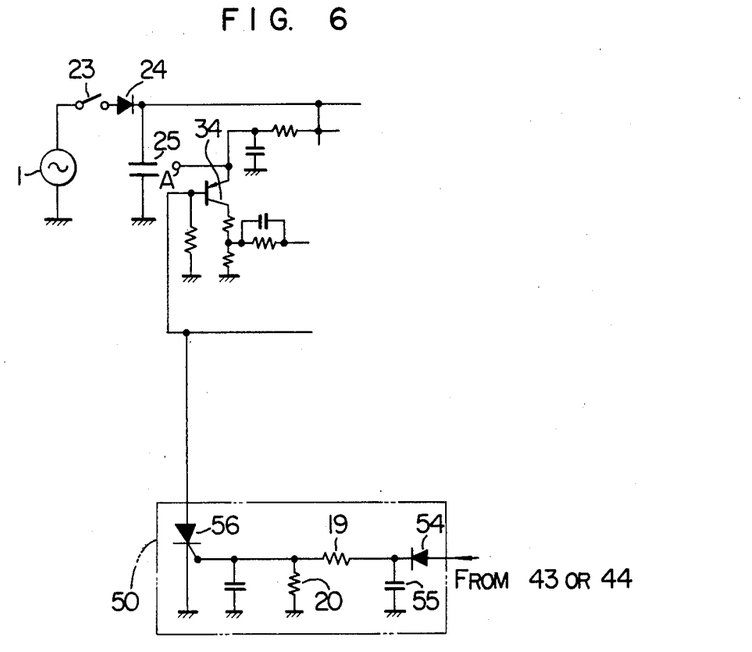
FIG. 6 shows a specific circuit of a modification of the abnormally high voltage extinguishing circuit shown in FIG. 3, according to another embodiment of the invention.

In the improved circuit 50' shown in FIG. 3, the wired combination of the zener diode 21, the transistor 22 and the holding circuit consisting of the transistor 51 and the resistors 52 and 53, has the same function as a thyristor such as a silicon controlled rectifier and therefore the combination may be replaced by a silicon controlled rectifier. In such a case, as shown in FIG. 6, the gate of the SCR 56 is connected with the junction point of the resistor 19 and 20, the cathode with the earth, and the anode with the base of the transistor 34 or any one of the points A, B, C and D shown in FIGS. 2 and 5.

In the above description, the abnormally high voltage extinguishing circuit according to the invention is explained as such a type that it has the switching element which connects the control circuit for the chopper circuit, including the pulse width modulating circuit and the exciting circuit, with the earth. However, the invention is not limited to such a type, but any kind of an abnormally high voltage extinguishing circuit of such a type as rendering the control circuit inoperative when an abnormally high voltage is induced so that the chopping operation of the chopper circuit is stopped falls within the scope of the invention. According to the invention, since a continual control to the current path of the chopper circuit is not directly made, a switching device of large current capacity and high breakdown voltage is not necessitated.

What we claim is:

1. An abnormally high voltage extinguishing circuit for a television receiver including a switching-type stabilized power supply circuit having a chopper circuit and a control circuit for controlling the switching operation of said chopper circuit so as to generate a stabilized output voltage from the power supply circuit, and a horizontal deflection circuit having a horizontal output circuit and a flyback transformer, said horizontal deflection circuit receiving the stabilized output voltage from said power supply circuit, supplying a current to a horizontal deflection coil, and also supplying a high voltage to an anode of a picture tube through said flyback transformer; said abnormally high voltage extinguishing circuit comprising first means for generating a voltage proportional to said high voltage and for detecting whether or not the generated voltage exceeds a predetermined level and second means connected with said first means for operatively controlling said control circuit to stop the switching operation of said chopper circuit when the voltage generated by said first means exceeds the predetermined level.

2. An abnormally high voltage extinguishing circuit as claimed in claim 1, wherein said second means includes a hold circuit for maintaining the operation of stopping the switching operation of said chopper circuit.

3. An abnormally high voltage extinguishing circuit as claimed in claim 1, wherein said second means includes a switching device operatively rendered conductive when said voltage generated by the first means exceeds the predetermined level to ground said control circuit.

4. An abnormally high voltage extinguishing circuit as claimed in claim 3, wherein said switching device includes a zener diode connected at one end thereof with said first means and a transistor whose base is connected with the other end of said zener diode, a collector to emitter circuit of said transistor being connected between said control circuit and ground.

5. An abnormally high voltage extinguishing circuit as claimed in claim 3, wherein said second means further includes a hold circuit for holding the conductive state of said switching device to maintain said control circuit at ground.

6. An abnormally high voltage extinguishing circuit as claimed in claim 5, wherein said switching device includes a zener diode connected at one end thereof with said first means and a first transistor whose base is connected with the other end of said zener diode, a collector to emitter circuit of said first transistor being connected between said control circuit and ground, and said hold circuit includes a second transistor whose base is connected with the collector to emitter circuit of said first transistor, a collector to emitter circuit of said second transistor being connected at one end thereof with said base of the second transistor through a resistor and connected at the other end with the base of said first transistor and with the ground through another resistor.

7. An abnormally high voltage extinguishing circuit as claimed in claim 6, wherein said first means includes a tertiary winding provided on said flyback transformer.

8. An abnormally high voltage extinguishing circuit as claimed in claim 6, wherein said first means includes a junction point of voltage dividing capacitors provided at the output of said horizontal output circuit.

9. An abnormally high voltage extinguishing circuit as claimed in claim 5, wherein said first means includes a rectifying device for rectifying said voltage proportional to said high voltage.

10. An abnormally high voltage extinguishing circuit as claimed in claim 9, wherein said rectifying device includes a diode provided in series with the output of said first means and a capacitor provided at the output side of said diode and in parallel with the output of said first means; said switching device includes a zener diode connected at one end thereof with said first means and a first transistor whose base is connected with the other end of said zener diode, a collector to emitter circuit of said first transistor being connected between said control circuit and ground; and said hold circuit includes a second transistor whose base is connected with the collector to emitter circuit of said first transistor, a collector to emitter circuit of said second transistor being connected at one end thereof with said base of the second transistor through a resistor and connected at the other end with the base of said first transistor and with ground through another resistor.

11. An abnormally high voltage extinguishing circuit as claimed in claim 10, wherein said first means includes a tertiary winding provided on said flyback transformer.

12. An abnormally high voltage extinguishing circuit as claimed in claim 10, wherein said first means includes a junction point of a voltage dividing capacitor provided at the output of said horizontal output circuit.

13. An abnormally high voltage extinguishing circuit as claimed in claim 3, wherein said switching device includes a silicon controlled rectifier having a gate, an anode and a cathode connected respectively with said first means, said control circuit and ground.

14. An abnormally high voltage extinguishing circuit as claimed in claim 13, wherein said first means includes a rectifying device for rectifying said voltage proportional to said high voltage.

15. An abnormally high voltage extinguishing circuit as claimed in claim 14, wherein said rectifying device includes a diode provided in series with the output of said first means and a capacitor provided at the output side of said diode and in parallel with the output of said first means.

16. An abnormally high voltage extinguishing circuit as claimed in claim 15, wherein said first means includes a tertiary winding provided on said flyback transformer.

17. An abnormally high voltage extinguishing circuit as claimed in claim 15, wherein said first means includes a junction point of voltage dividing capacitors provided at the output of said horizontal output circuit.

18. An abnormally high voltage extinguishing circuit as claimed in claim 1, in which said control circuit comprises a pulse width modulating circuit for producing a pulse output of a desired pulse width and an exciting circuit receiving as an input the output of said pulse width modulating circuit for controlling the switching operation of said chopper circuit in accordance with the pulse width of said input; wherein said second means includes a device for stopping the operation of one of said pulse width modulating circuit and said exciting circuit when said voltage generated by said first means exceeds the predetermined level.

19. An abnormally high voltage extinguishing circuit as claimed in claim 18, wherein said stopping device comprises a switching device for grounding said one of the pulse width modulating circuit and the exciting circuit when rendered conductive.

20. An abnormally high voltage extinguishing circuit as claimed in claim 19, wherein said second means further includes a hold circuit for holding said switching device conductive.

21. An abnormally high voltage extinguishing circuit as claimed in claim 1, wherein said first means includes a tertiary winding provided on said flyback transformer a passive network including a resistor and connected to said tertiary winding for generating said voltage proportional to said high voltage across said resistor.

22. An abnormally high voltage extinguishing circuit as claimed in claim 1, wherein said first means includes two voltage dividing capacitors connected in series provided at the output of said horizontal output circuit and a passive network including a resistor connected to a junction point of said capacitors for generating said voltage proportional to said high voltage across said resistor.

23. An abnormally high voltage extinguishing circuit as claimed in claim 1, in which said control circuit includes a transistor and a device for controlling said transistor; wherein said second means is connected with one of the base, emitter and collector of said transistor; said device for controlling said transistor being rendered inoperative when said voltage proportional to said high voltage exceeds the predetermined level.

24. An abnormally high voltage extinguishing circuit as claimed in claim 1, in which said control circuit includes a pulse width modulating circuit having a first transistor the emitter of which is connected with a power supply, the base of which receives a control input signal and the collector of which delivers a pulse output of a desired pulse width; an exciting circuit which receives as an input the output of said pulse width modulating circuit and controls the switching operation of said chopper circuit in accordance with the pulse width of said input; a waveform shaping circuit which receives a voltage proportional to an output voltage of said horizontal deflection circuit and delivers said control input signal; and a starting circuit which supplies a starting signal for starting said power supply circuit to said base of said first transistor; wherein said first means includes a tertiary winding provided on said flyback transformer, and a rectifying device having a diode connected in series with the output of said tertiary winding and a capacitor provided at the output side of said diode and connected in parallel with the output of said tertiary winding; and said second means includes a switching device having a zener diode connected with said first means and a second transistor with a base, a collector and an emitter connected respectively with said zener diode, said emitter of said first transistor and ground, and a hold circuit having a third transistor with a base, an emitter and a collector connected respectively with said collector of said second transistor, said collector of said second transistor through a resistor, and said base of said second transistor and ground through another resistor.

* * * * *